US006587466B1

(12) United States Patent
Bhattacharya et al.

(10) Patent No.: US 6,587,466 B1
(45) Date of Patent: Jul. 1, 2003

(54) SEARCH TREE FOR POLICY BASED PACKET CLASSIFICATION IN COMMUNICATION NETWORKS

(75) Inventors: Partha P. Bhattacharya, Cupertino, CA (US); Sanjay D. Kamat, Ossining, NY (US); Rajendran R. Rajan, Bronx, NY (US); Saswati Sarkar, Hyattsville, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/320,903

(22) Filed: May 27, 1999

(51) Int. Cl.[7] .............................................. H04L 12/28
(52) U.S. Cl. ........................... 370/395.21; 370/395.32; 370/395.43; 370/411; 370/471
(58) Field of Search ................................. 370/229, 230, 370/235, 351, 389, 392, 411, 422, 546

(56) References Cited

U.S. PATENT DOCUMENTS

| | | | | |
|---|---|---|---|---|
| 5,255,368 A | * | 10/1993 | Barry | 709/243 |
| 5,471,623 A | * | 11/1995 | Napolitano, Jr. | 370/412 |
| 5,781,772 A | * | 7/1998 | Wilkinson et al. | 370/229 |
| 6,341,130 B1 | * | 1/2002 | Lakshman et al. | 370/351 |
| 6,351,561 B1 | * | 2/2002 | Iyengar | 382/226 |

OTHER PUBLICATIONS

A Conflict Sense Routing Protocol and its Performance for Hypercubes; Varvarigos, E.A.; Bertsekas, D.P. Computers, IEEE Transactions on, vol. 45 Issue: 6, Jun. 1996; pp. 693–703.*

A Theory for Total Exchange in Multidimensional Interconnection Networks; Imakopoulos, V.V.; Dimopoulos, N.J. Parallel and Distributed Systems, IEEE Transactions on , vol.: 9 Issue: 7, Jul. 1998.*

The Priority Broadcast Scheme for Dynamic Broadcast in Hypercubes and Related Networks; Chi–Hsiang Yeh; Varvarigos, E.A Hua Lee; Frontiers of Massively Parallel Computation, 1999. Frontiers.*

V. Srinivasan et al., "Fast and Scalable Layer Four Switching," Proc. SIGCOMM 98, Vancouver, Sep., 1998.

T. Lakshman et al., "High–Speed Policy–based Packet Forwarding Using Efficient Multi–dimensional Range Matching," Proc. SIGCOMM 98, Vancouver, Sep. 1998, p. 203–214.

* cited by examiner

*Primary Examiner*—Hassan Kizou
*Assistant Examiner*—David Odland
(74) *Attorney, Agent, or Firm*—Louis P Herzberg

(57) ABSTRACT

An apparatus, a search tree structure, methods and computer devices for constructing and using the structure to efficiently accomplish policy based service differentiation in packet networks is presented. This invention reduces the number of steps performed to implement packet classification. It uses a method of preprocessing a given set of policy rules by modeling the conditions in the rules as multidimensional hyper-cubes, a simple and compact search tree is constructed. Using this search tree, packet classification is achieved determining all applicable policies for a packet with a few compare and branch instructions.

98 Claims, 6 Drawing Sheets

Figure 1: Illustration of Prior Art

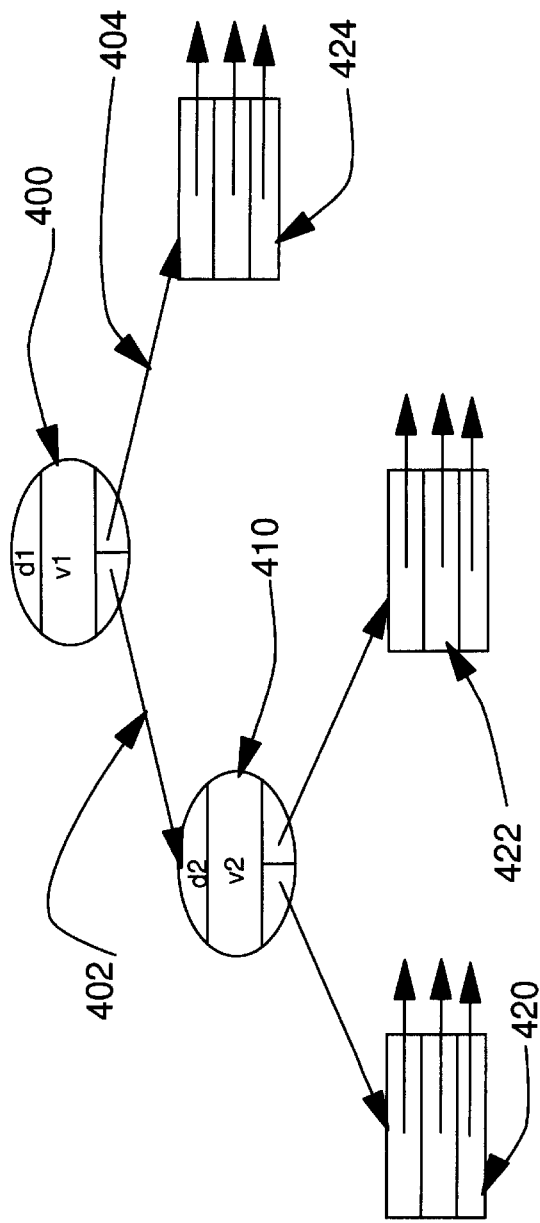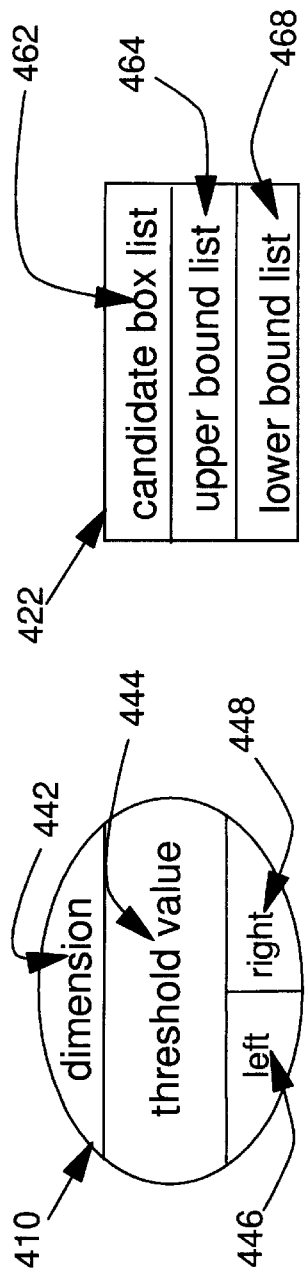
Fig. 4a
Fig. 4b
Fig. 4c

SEARCH TREE FOR POLICY BASED PACKET CLASSIFICATION IN COMMUNICATION NETWORKS

FIELD OF THE INVENTION

This invention relates to the field of packet data communication networks. It is more particularly directed to packet data transmission systems that provide service to individual packets based on defined policy criteria.

BACKGROUND OF INVENTION

This invention addresses the problem of efficiently supporting multiple services in packet networks. A key aspect of such support involves discriminating among different packets based on their contents and administratively defined policies. Most packet data networks, including the global Internet and various enterprise networks based on the Internet protocol (IP), have employed a "nondiscriminatory best-effort service model." In this model, network offers a uniform service to all traffic, in the sense that devices treat all packets equally in terms of their access to resources. An alternate model, known as "policy based service differentiation model" has several advantages. In this model, network offers many kinds and levels of service where different packets may get different treatment based on administratively defined policies.

This latter service model is motivated by several factors. Firstly, the number and variety of applications that generate packet traffic in networks is continuously increasing. Each of these applications has varying networking service requirements. Secondly, technologies and protocols that enable provision of many kinds of services having different levels of security and Quality of Service (QoS) are widely available. However, access to these services needs to be regulated because these services consume resources such as network bandwidth, memory and processing cycles in network devices. Thirdly, business objectives or organizational goals may be better served by discriminating between different kinds of traffic in the network rather than by treating all traffic in a uniform manner.

The importance of these motivating factors is illustrated by considering some common examples:

Traffic generated by an application such as voice over IP (VOIP) requires a low delay service while that generated by a file transfer application can tolerate longer delays.

When two network service providers, or an enterprise and a network service provider, enter into a bilateral Service Level Agreement (SLA), the agreement may dictate that the service provider guarantee performance levels (e.g., bandwidth, delay, packet loss, etc.) to certain classes of traffic under specific conditions. Obviously, enforcement of such an SLA calls for policy based differentiation among various packets in the network.

Traffic generated by a web commerce application includes packets that carry sensitive financial transaction information which need a high level of security while most other web traffic does not.

A firewall that protects a company network may have to filter incoming traffic and selectively drop certain packets based on security policies.

A Virtual Private Network (VPN) implemented on a shared public packet data network may incorporate security and QoS features for specific categories of traffic.

As an example of how traffic could differ in its importance, consider the traffic generated by casual World-Wide-Web browsing by employees as opposed to that generated by important mission-critical applications. Since both kinds of traffic compete for the same network resources, the latter, being more important, should be insulated from the former.

A central requirement in enabling policy based service differentiation in packet networks, is that many network devices need to play an active role in classifying packets into categories based on applicable policy rules. It would be advantageous to have an efficient method to do such classification.

In general, rules that specify service differentiation policies are called Policy Rules and are of the form:

if (policy condition) then (policy action).

In the context of IP networks, which is one of the most common packet switched networks today, policy conditions are primarily specified in terms of various packet attributes. These attributes include header fields that identify source and destination addresses of the packet, applications identified by the source and destination port numbers, value of the protocol field, type-of-service-byte, etc. Additionally, policy conditions may also include other criteria such as time of day, identity of the local interfaces on which packet has arrived or will depart, etc. Such packet attributes and criteria used in choosing policy rules are herein referred to as 'selector' attributes. In general, policy rules are range based in the sense that policy conditions of the policy rules are defined in terms of ranges of selector attribute values.

Policy actions in policy rules include accepting or dropping data packets (for instance, in the context of a firewall functionality), accepting or denying a request for resource reservation (for instance, in the context of a protocol such as RSVP), encrypting data packets, authenticating the sender, (for instance, in the context of the IPSEC standards), metering the data traffic, marking the type-of-service byte in packet header, shaping the traffic rate, (for instance, in the context of the differentiated services standards).

FIG. 1 is an example of how policy administration may be organized. It shows a scenario in which a set of rules are defined as security policy rules (e.g. drop all incoming traffic that is destined to port number X, encrypt all outgoing traffic originating from sources in the address range A1 ... A2, and leaving on interface Y) and another set as policy rules for quality of service based discrimination (e.g. mark all traffic from sources in the address range A1 ... A2 and leaving on interface Y as high priority). These sets of rules are installed in a device 100 through configuration from a configuration utility 110. Device 100 is a network edge device that provides service differentiation. It contains security enforcement (filtering) module 120 and quality of service enforcement (filtering) module 130. These modules are respectively responsible for security and quality of service based differentiations. During configuration, an administrator configures the two modules over an interface 115 providing the modules 120 130 with their corresponding policy rules. Such configuration is done from a console attached to the device. As data packets 140 arrive at device 100, the two modules 120 and 130 separately process the packet in an order that is determined by the device architecture. The data packets 145 leave the device after receiving appropriate conditioning treatment.

In this illustration, parts of the packet processing steps are similar in both modules 120 and 130. These steps involve determining which of the specified set of policy rules are applicable. Module 120 scans only the security policy rules, and module 130 scans only the quality of service policy rules. Each module also directly applies the relevant actions to packets once an applicable policy rule is found. Often, in practice, creating a meaningful higher level service requires combination of multiple lower level services. For example, a virtual private network service offering may combine both security and quality-of-service elements. In such a scenario, packets belonging to a certain class will require both security and quality of service specific actions. In the case illustrated in FIG. 1, this implies that such packets go through identical classification steps twice, once in module 120 and again in module 130. In general, in a network device architecture that implements policies through separate configuration of multiple service specific modules, there is likelihood of redundant steps in processing individual packets. This reduces the overall throughput.

The classification process to determine applicability of a set of policy rules to a packet is in itself a time consuming process. This is primarily because of the multiple dimensions and criteria involved. Each policy condition may be specified in terms of sub-nets or arbitrary address ranges (particularly when addresses are dynamically assigned) for source or destination, similarly for protocol and port number fields in IP packet headers. Assets are inefficiently used to preprocess a given set of rules and order them by priority. During packet processing, a module sequentially scans the list of policy rules to determine whether a given rule is applicable to the packet being processed. This is continued until a first match is found or the end of list is reached. If a match is found, the module applies the actions specified in the matched rule and hands over the packet to the next module after completing its processing. If no match is found, packet receives the default treatment in the module. Since such a sequential search is time consuming, some of the recent published work has sought to design more efficient packet classification methods. Two of the most relevant ones are discussed below.

Given the increasing importance of policy based service differentiation in packet networks, there is a need for efficient solution to the multi-attribute packet classification problem. Since such classification often consumes computational resources affecting the device performance, it is advantageous that this be done using a few simple instructions and avoiding redundant processing.

The following are definitions of terms used herein:

Selector attribute: A packet's attributes and/or administrative criteria used in defining policy conditions in policy rules. Values of selector attributes for a packet are used to determine which policy rules are applicable for that packet.

Policy Rule: A rule which specifies the specific treatment that is to be accorded to a particular class of packet traffic under defined conditions. It is generally of the form:

if (policy condition) then (policy action)

Policy Condition: A part of a policy rule that specifies a class of packet traffic and administrative criteria for which the rule applies. A policy condition is formally defined in terms of selector attributes.

Policy Action: A part of a policy rule that specifies particular action(s) to be executed when the policy rule is deemed applicable.

Range Based Policy Rule: A policy rule whose conditions can contain at least one range of values for one or more selector attributes.

Policy Based Classification: The process of determining which policy rules are applicable for a particular packet.

Multidimensional space: An Euclidean space in two or more dimensions. In an embodiment of the present invention, each dimension corresponds to a particular selector attribute.

Hypercube: Analogous to a rectangle in two dimensions or a cube in three dimensions. Also referred to herein as a box.

Point Location Problem: The problem of determining in which of a given set of hypercubes a given point in multidimensional space belongs. As used herein, the point location problem is obtained by modeling a packet to be classified based on policy rules as a point, and the policy rule conditions as hypercubes in a multidimensional space.

Hyperplane: Analogous to a line in two dimensions. In an advantageous embodiment of the present invention, a hyperplane is orthogonal to one of the coordinate axes.

Bounding Box: A hypercube that restricts the point location problem by guaranteeing that the given point must lie in this hypercube.

Left-subproblem: A smaller point location problem obtained by focusing on a portion of the multidimensional space that lies to the left (or any one side) of a chosen hyperplane.

Right-subproblem: A smaller point location problem obtained by focusing on the portion of the multidimensional space that lies to the right (or another side) of a chosen hyperplane.

Combined Policy-matching (or Policy rule matching) Engine (CPE): A module in the example architecture responsible for policy based packet classification.

Policy Manager/Repository (PMR): A module in the example architecture that stores the policy rules.

Policy Enforcement Entity (PEE): A module in the example architecture where actions specified by policy rules are executed.

Search Tree: A data structure that guides a policy classification process by specifying appropriate comparisons of selector attributes and branch instructions based on the results of a comparison.

Root Node: The first node of a search tree, where a packet classification process begins.

Intermediate Node: A non-terminal node of the search tree.

Leaf Node: A terminal node of the search tree.

SUMMARY OF INVENTION

Therefore, it is an aspect of the present invention to present methods, system, apparatus, computer devices and architecture for enabling policy based service differentiation in packet networks that reduce the number of packet classification steps.

It is yet another aspect of the present invention to provide a method of preprocessing a given set of policy rules by modeling the policy conditions in the policy rules as multidimensional boxes (hyper-cubes) to generate a search tree.

It is a further aspect of the present invention to provide a method of classifying packets to determine applicable policies with the help of the search tree using few and simple instructions.

It is still yet another aspect of the present invention to implement preprocessing of policy rules to build a search tree, and use the search tree to classify packets as computer readable program code contained on a computer usable medium.

In an embodiment of the present invention, the aforementioned aspects are achieved by identifying applicable actions for a packet in one classification step. This step itself uses few simple compare and branch instructions according to a search tree constructed by preprocessing policy rules using multidimensional box (hyper-cube) representations of policy rule conditions.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 4a illustrates an example search tree formed as a binary search tree in accordance with the present invention;

FIG. 4b shows an example internal node in a binary search tree in accordance with the present invention;

FIG. 4c shows an example leaf node in a binary search tree in accordance with the present invention;

In the following description, reference is made to the accompanying drawings which form a part hereof, and in which is shown by way of illustration specific example embodiments in which the invention may be practiced. It is to be understood that other embodiments may be utilized and structural changes may be made without departing from the scope of the present invention.

DETAILED DESCRIPTION OF THE INVENTION

Figure 1:
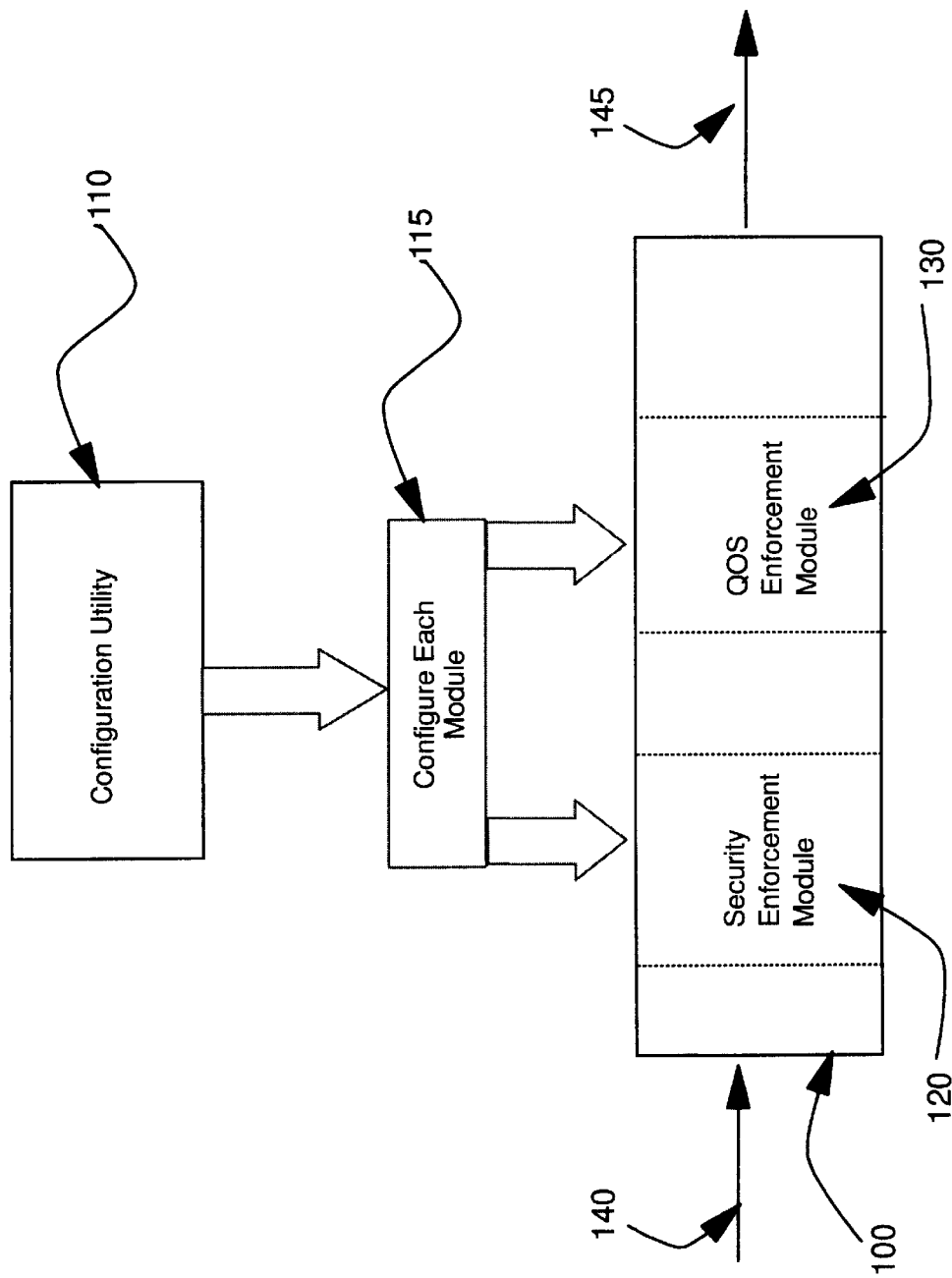
FIG. 1 illustrates a system for enabling policy based services in packet networks.
Figure 2:
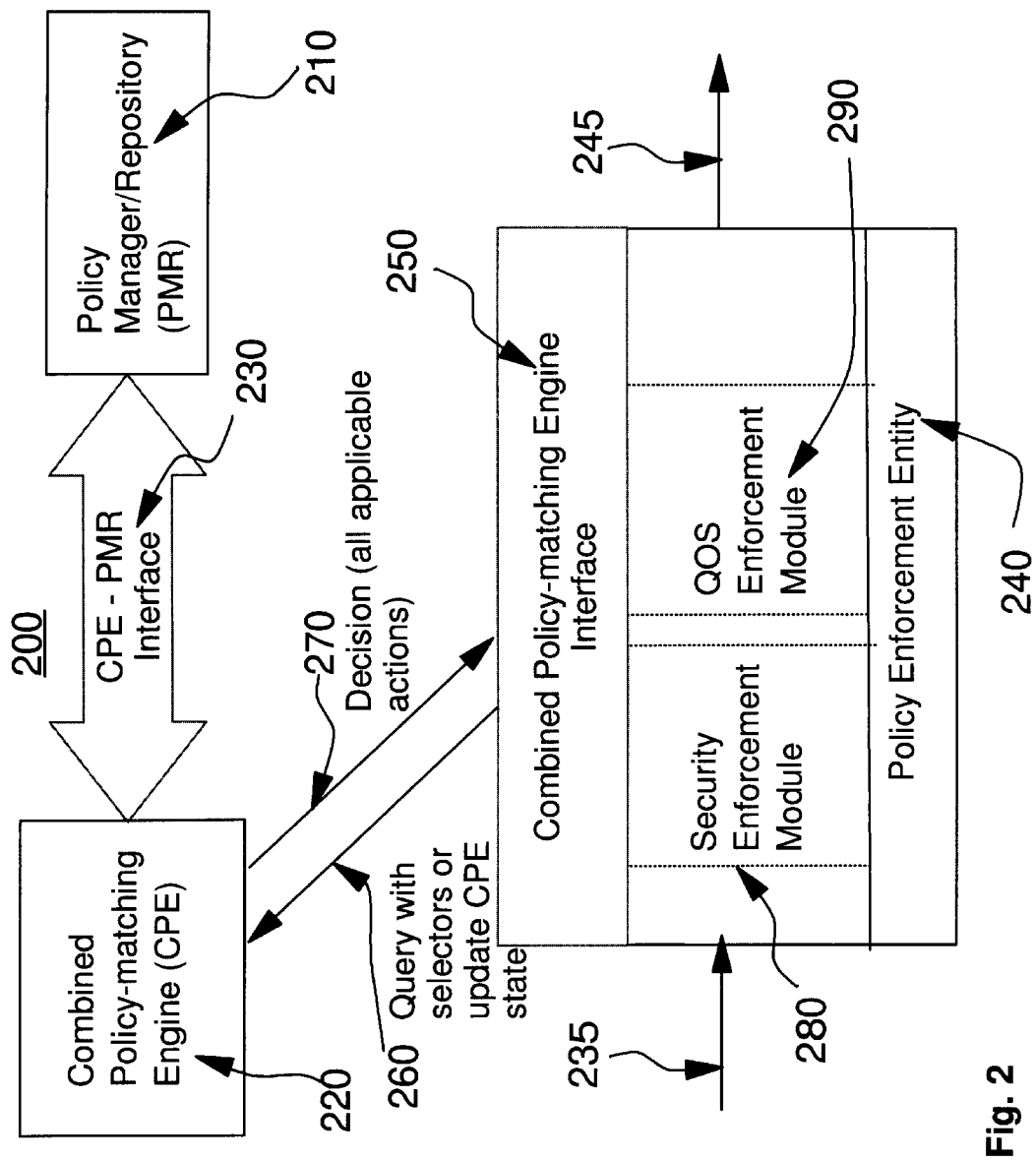
FIG. 2 illustrates an example architecture in which classification steps are reduced by localizing these steps in a 'Combined Policy-matching Engine' in accordance with the present invention.

An example architecture 200 for discriminated policy-based services is shown in FIG. 2. The application of the methods outlined in this invention is not restricted to this architecture, which is provided solely as a guide for the purpose of illustration. A Policy Manager/Repository (PMR) 210 provides tools used by a network policy administrator to define, validate and store policy rules. The Policy Enforcement Entity (PEE) 240 resides in a device that processes packet traffic. For example, such devices may be either endhosts that generate packets, or routers that forward packets.

In general, the Policy Enforcement Entity 240 has several service specific modules that influence the treatment a packet receives in the device. Controlling the behavior of these modules results in the actions specified by the applicable policies.

In an embodiment, an entire (or a large part of a) classification operation is carried out in a Combined Policy-matching Engine (CPE) 220. As part of initialization, the Combined Policy-matching Engine 220 fetches a number of policy rules from the Policy Manager/Repository 210 and organizes them into an efficient search tree. This search tree is used by the Combined Policy-matching Engine 220 to provide traffic classification service to the Policy Enforcement Entity 240. It does this by reporting the results of classification in the form of the applicable actions that need to be executed within the service specific modules of the Policy Enforcement Entity 240.

FIG. 2 particularly illustrates this architecture in the context where the Policy Enforcement Entity 240 is an edge router. In this architecture, the Policy Enforcement Entity 240 obtains all actions that are applicable for a packet by querying the Combined Policy-matching Engine 220. The decisions returned by the Combined Policy-matching Engine 220 determine the actual treatment that a packet receives within the Policy Enforcement Entity 240. It may also influence the order in which the service specific modules, such as Security Enforcement Module 280 and QOS Enforcement Module 290, process the entering packets 240 before they leave the device in a possibly conditioned or transformed state 245.

The decisions 270 returned by the Combined Policy-matching Engine 220 depend on the following:

The set of policy rules obtained from the Policy Manager/Repository 210 over the interface 230.

The set of values for Selectors 260 which are defined as the attributes associated with an incoming packet that are necessary for packet classification. Policy Enforcement Entity 240 provides these values as inputs in the query using the Combined Policy-matching Engine Interface 250.

Some common and important selector attributes include the source address, destination address, protocol, source port, destination port, the Type Of Service (TOS) field, the ingress and the egress interface (for a router), etc.

Some internal state within the Combined Policy Matching Engine 220 that may be instantiated, set or modified by the various service specific modules of the Policy Enforcement Entity 240 using the Combined Policy Matching Engine Interface 250. For example, one policy at a firewall may dictate that all packets matching specified conditions be transmitted within an IPSec tunnel. When the first packet matching these conditions is received at the Combined Policy Matching Engine 220, it returns a decision 270 directing the Security module 280 to install an IPSec tunnel. In this case, after IPSec signaling has been successfully completed and tunnel state installed in the router, the Security Enforcement Module 280 instructs the Combined Policy-matching Engine 220 to return the tunnel handle as part of the decision returned for all succeeding data packets matching the policy conditions.

Geometric Representation of the Policy Matching Problem

The selectors having values for a packet passed as input of query by the Policy Enforcement Entity 240, are important because policy rule conditions are defined in terms of their ranges. For example, a policy rule may be defined for specific source and destination address ranges. One important observation in this regard is that, selector values have numerical equivalents. Consequently, given a certain set of selectors, say "D" selectors, each policy condition is represented by a "D" dimensional box, or hyper-cube having edges wherein each edge is defined by one selector range.

Figure 3:
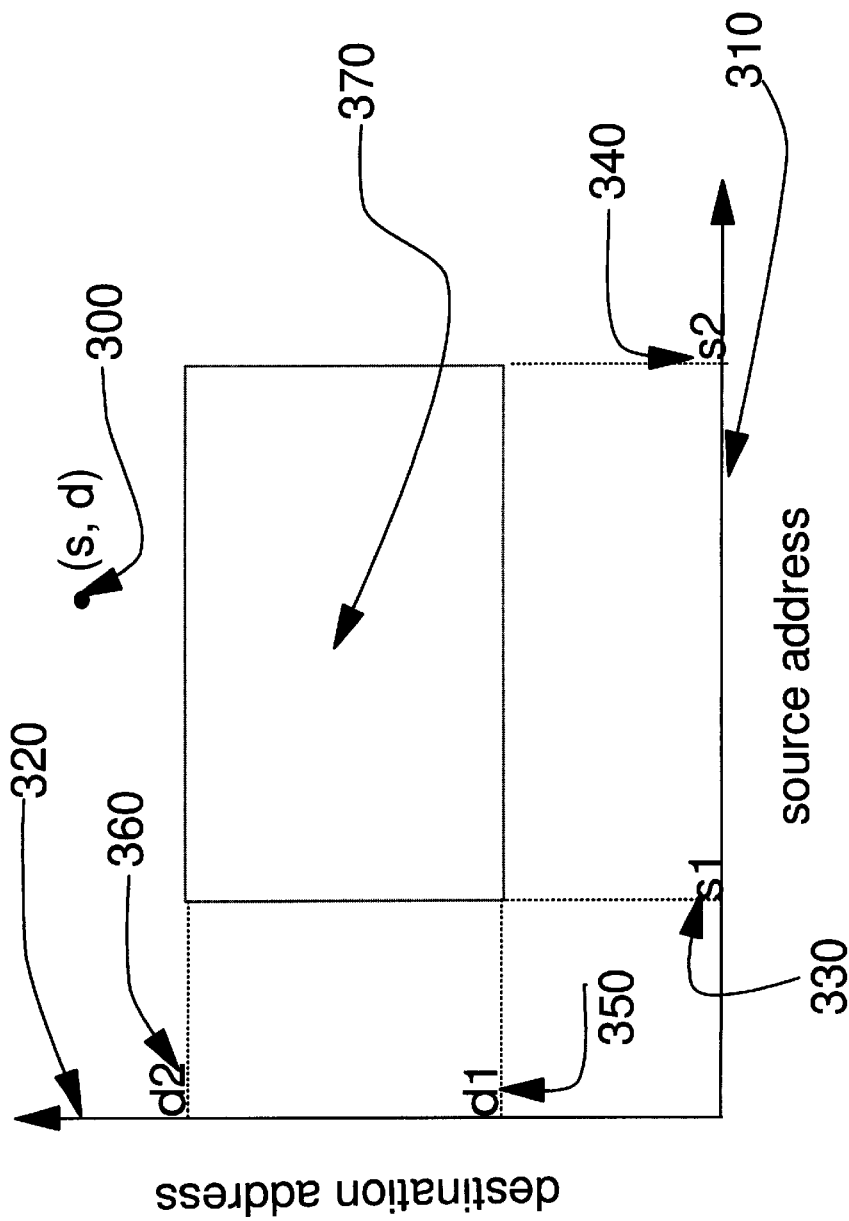
FIG. 3 illustrates an example representation of a policy rule condition as a rectangle (hyper-cube or box of dimension two) when only two attributes are used in accordance with the present invention.

FIG. 3 illustrates a policy rule condition for an example situation which has only two selectors, ("D"=2), say source and destination addresses. A packet with given selector values then can be represented as a single point 300 in a two dimensional space, with the source address attribute on the X-axis 310 and the destination address attribute on the Y-axis 320. Consider a policy rule whose conditions are defined by the source address range [s1 330, s2 340] and the destination address range [d1 350, d2 360]. With this geometric representation, the condition part of this policy rule is represented by a rectangle whose left and right boundaries along the X-axis are defined by the lines x=s1 330, and x=s2 340, and those along the Y-axis are defined by the lines y=d1 350, and y=d2 360. Thus, this policy rule is applicable to a given packet whose source address is 's' and destination address is 'd', if the corresponding "point" representation of the packet 300 lies within the "box" representation 370 of the policy rule condition. Point 300, as shown in FIG. 3, does not lie in box 370.

In general, for "D" attributes, the packets are represented geometrically as points in a "D" dimensional space, and the policy rule conditions as "D" dimensional boxes (hypercubes) having faces defined by hyperplanes associated with the left (one side) and right (another side) boundaries of the attribute ranges in the policy conditions. Given a packet and a particular set of policy rules that are similarly represented, the policy matching problem can be thought of as identifying all the policy condition "boxes" to which the given packet "point" belongs. Priorities associated with corresponding rules are used to resolve ambiguous actions. This geometric representation of the packet classification problem is central to the search tree construction process. It allows the design of packet classification techniques that are flexible enough to deal with a wide variety of selectors and rules within a single framework.

Description of the Search Tree

An example of a search tree is shown in FIG. 4a. In the embodiment described, the search tree is a binary tree rooted at 400. The tree has two kinds of nodes, interior node 400 and 410, and leaf nodes 420, 422 and 424 in the illustration. The root node 400 is generally considered to be an interior node. Root node 400 has two integer values 'd1' and 'v1' and two pointers indicating the left 402, and right 404, subtrees.

FIG. 4b shows an internal node 410 of the tree in greater detail. An internal node stores a dimension number 442, a threshold integer value 444, pointer to left child node 446 and right child node 448.

FIG. 4c shows a leaf node 422 of the tree in greater detail. The leaf node 422 stores a short list of candidate boxes 462, and two lists of dimensions 464 and 468 associated with each candidate box. The lists specify the dimensions along which the lower and upper boundaries of a candidate box is to be checked to verify whether a given point belongs to that box. The precise meaning of these fields will become clearer in the context of the search tree traversal method described next.

Search Tree Traversal

Given a point p=(p_1, ..., p_D) in "D" dimensions, the search tree is traversed to determine all the boxes that contain p. Generally, if no match is found, a default policy decision is returned.

Figure 5:
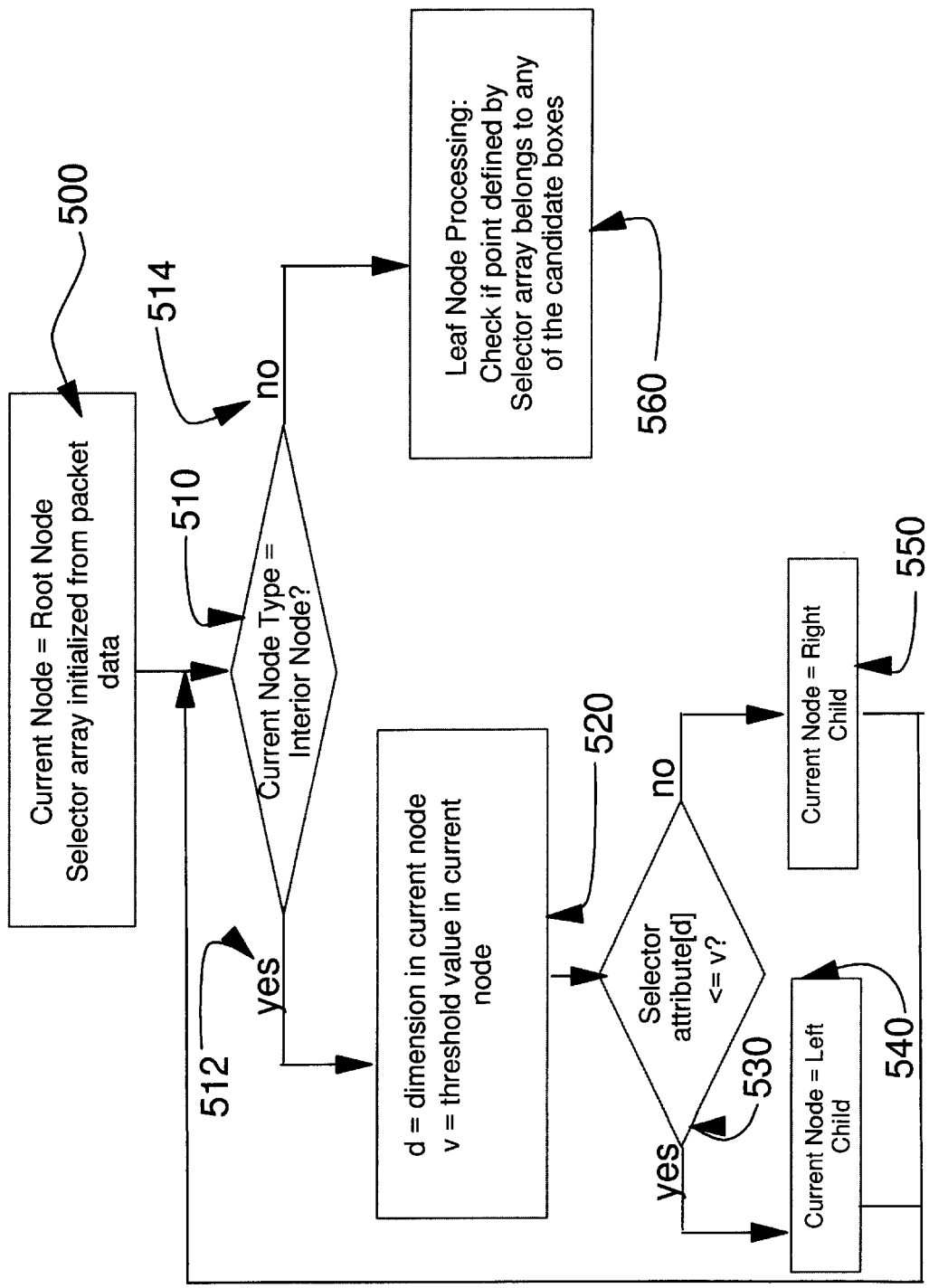
FIG. 5 shows an example flowchart of a packet classification process in accordance with the present invention.

An example of a search method is illustrated with a flowchart shown in FIG. 5. The search begins at the root node by assigning Current Node to the Root Node in the initialization step 500. This step also initializes Selector array with values from the packet attributes to represent it as a point in the "D" dimension space. The next step in each iteration is a comparison 510, which determines if the current node is an interior node or a leaf node. If it is an interior node, the search proceeds along path 512 to step 520. Step 520 assigns to 'd' the dimension number stored in the current node and to 'v' the threshold value from the current node. Next, comparison in step 530 checks if the value of a "d"th attribute in the selector array associated with the packet is at least as large as the value 'v' obtained in step 520. If so, the left child of the Current Node is made the new Current Node in step 540, otherwise, the right child is made the new Current Node in step 550. In either case, the search proceeds to begin another iteration with the comparison in step 510. Such iterations end when the result of comparison in 510 indicates that the Current Node is a leaf node. In this case, path 514 leads to the final step of 560, where each of the candidate rules in the leaf node are tested for applicability for the current packet.

This testing involves the following detailed sub-steps: If the list of candidate boxes stored in the leaf node is empty, then search terminates without finding a match. When this happens, a default policy decision is returned by the Combined Policy-matching Engine. Otherwise, each of the candidate boxes in the candidate list is considered for applicability, one by one. The applicability test for each box is aided by the two lists of dimensions associated with each candidate box. These are examined as follows:

Let $W=((x\_\{1\}, y\_\{1\}), \ldots, (x\_\{D\}, y\_\{D\}))$ denote a candidate box. Here, $x\_\{1\}$ and $y\_\{1\}$ represent the lower and the upper bounds of the range in dimension 1 used to specify the condition. The pairs $(x\_\{2\}, y\_\{2\})$ $(x\_\{3\}, y\_\{3\}), \ldots, (x\_\{D\}, y\_\{D\})$ have similar interpretations. The given point p belongs to box W if both of the following conditions hold:

i. for each dimension d in the upper bound dimension list associated with W, Selector Array[d]<=y_{d}, and
  ii. for each dimension d in the lower bound dimension list associated with W, Selector Array[d]<=x_{d}.

If none of the boxes in the candidate list meets the above conditions then search terminates without finding a match. In this case, the default policy decision is returned by the Combined Policy-matching Engine.

Search Tree Construction

During its initialization, the Combined Policy-matching Engine 220 fetches the relevant policy rules from the Policy Manager/Repository 210 and preprocesses them to construct the search tree. In a particular embodiment, for flexibility and the convenience of trading memory space for computation time, we allow for building the search tree based on fewer dimensions, say "D_e", where "D_e" may be less than or equal to the actual number of Selectors "D" used to define policies. In this context of chosen set of selectors, two boxes, $W\_1=((x\_\{11\}, y\_\{11\}), \ldots, (x\_\{D1\}, y\_\{D1\}))$,
and $W\_2=((x\_\{12\}, y\_\{12\}), \ldots, (x\_\{D2\}, y\_\{D2\}))$,
are defined to be equivalent, if the relations
$x\_\{11\}=x\_\{12\}$, and
$y\_\{11\}=y\_\{12\}$
hold for $1<=I<=D\_e$.

The detailed steps in building the search tree structure are described below.

Step 1. Initialization, Includes the Following Substeps:

Let $S\_\{init\}=\{W\_1, \ldots, W\_N\}$ represent the entire set of policy rules.

Let $Y\_1(S)=\{y\_\{ij\}: W\_j \in S\}$ represent the set of right end-points in dimension i of all the boxes $W\_j$ in set S.

Let $m\_i$ and $M\_i$ denote respectively the minimum and maximum possible values in the i-th dimension.

Let $B\_\{init\}=((m\_1, M\_1), \ldots, (m\_D, M\_D))$ be the subset of the entire "D"-dimension space representing the bounding box. Any given point p in the classification problem must belong to $B\_\{init\}$.

Step 2. Building the Search Tree:

The search tree is constructed by calling a recursive routine such as buildTree described below. The routine buildTree is first invoked with the variables $S\_\{init\}$ and $B\_\{init\}$ initialized in step 1.

The routine buildTree is described next. It accepts two input parameters: a list of boxes S and a bounding box B. It creates a new tree node and calls itself recursively to create left and right subtrees if the node created is an interior node. The bounding box B represents the region within which the given point p must lie if tree traversal during search reaches that newly created node.

An example, buildTree(S, B) routine is performed using the following steps:

If S is empty then create a leaf node with an empty candidate box list, empty upper and lower bound lists and terminate.

If all boxes in S are equivalent, or if none of the boxes in S has a right boundary $y\_d$ that is within the bounding box B, then create a leaf node as follows and then terminate:

Set the list of candidate boxes in the leaf node to S.

Let $W=((x\_\{1\}, y\{1\}), \ldots, (x\_\{D\}, y\_\{D\}))$
be a box in S. For each box W in S, create the two associated dimension lists as follows:
  i. For each dimension $1<=d<=D\_e$, include d in lower bound list if $x\_d>m\_d$.
  ii. For each dimension $1<=d<=D\_e$, include d in upper bound list if $y\_d<M\_d$.

Else, invoke the routine findBestCut (described below), with the parameters S and B. This routine evaluates the set of left and right boundaries $Y\_\{i\}(S)$ of boxes in S that are inside the bounding box B, according to a cost function (to be described later). It returns the best one as defined by dimension number d
and threshold value v*. Use these values in the next step as described below.

Create an interior node as follows:
  i. set the dimension number and the threshold value in the interior node to d* and v* respectively.
  ii. form left subtree as follows. Let $S\_\{left\}$ denote the boxes in S whose lower boundary along dimension d* is at most v*, that is,
      $S\_\{left\}=\{W=((x\_\{1\}, y\_\{1\}), \ldots, (x\_\{D\}, y\_\{D\})) \in S: x\_\{d*\}<=v*\}$.
  iii. Let $B\_\{left\}$ denote the bounding box for the left child as follows:
      $B\_\{left\}=((m\_1, M\_1), \ldots, (m\_\{d*-1\}, M\_\{d*-1\}), (m\_\{d*\}, v*), (m\_\{d*+1\}, M\_\{d*+1\}), \ldots, (m\_\{D\_e\}, M\_\{D\_e\}))$.
  iv. Invoke buildTree with the parameters $S\_\{left\}$ and $B\_\{left\}$ to form the left subtree of the newly created interior node.
  v. Let $S\_\{right\}$ denote the boxes in S whose upper boundary along dimension d* is strictly greater than v*, that is,
      $S\_\{right\}=\{W=((x\_\{1\}, y\_\{1\}), \ldots, (x\_\{D\}, y\_\{D\}))$ in S: $y\_\{d*\}>v*\}$.
  vi. Let $B\_\{right\}$ denote the bounding box for the right child as follows:
      $B\_\{right\}=((m\_1, M\_1), \ldots, (m\_\{d*-1\}, M\_\{d*-1\}), (v*, M\_\{d*\}), (m\_\{d*+1\}, M\_\{d*+1\}), \ldots, (m\_\{D\_e\}) (M\_\{D\_e\}))$.
  vii. Invoke buildTree with the parameters $S\_\{right\}$ and $B\_\{right\}$ to form the right subtree of the newly created interior node.

Description of the findBestCut Routine Used During Search Tree Construction

Recall that at each stage, the search tree construction works on two inputs: a set of boxes S and a bounding box B, and creates a new node in the tree.

The bounding box B represents the region within which a given point must lie if tree traversal during search reaches that newly created node. The findBestCut routine is used to create the new node. The findBestCut routine looks for a "good" $D\_\{e-1\}$ dimensional hyperplane. A hyperplane can be used to divide the original problem into two smaller subproblems. One subproblem deals with all those boxes from S that are partly or wholly to the "left" of the hyperplane, but not those that are wholly to its "right". The bounding box for this subproblem is obtained by replacing the appropriate right boundary of the bounding box B by the hyperplane. Similarly the other sub-problem deals with those boxes that are partly or wholly to the "right" of the hyperplane but not those that are wholly to the left of the hyperplane. The bounding box for this sub-problem is obtained by replacing the appropriate left boundary of the bounding box "B" by the hyperplane.

Figure 6:
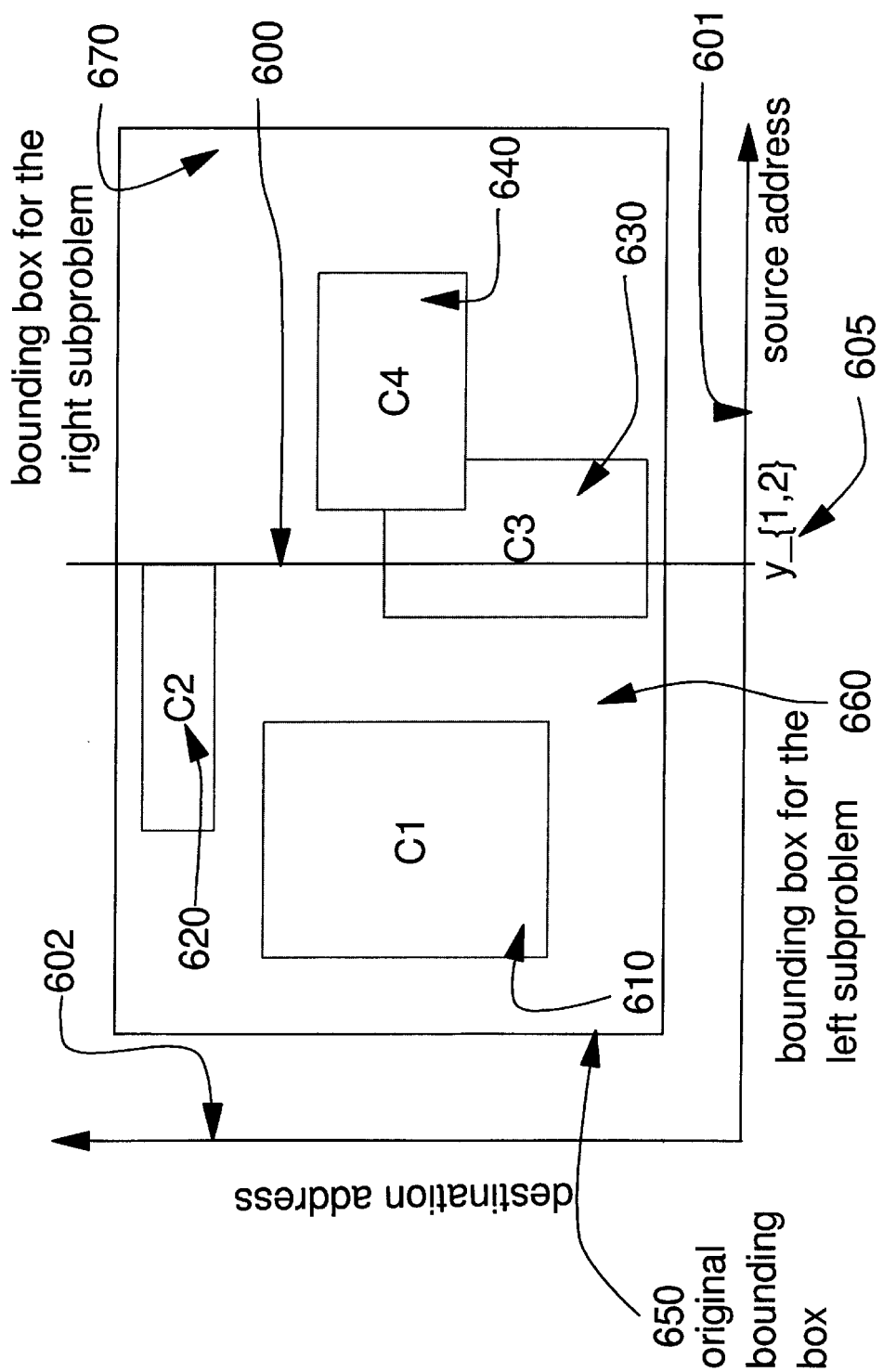
FIG. 6 shows an example representation of four different policy rule conditions using two attributes, with a hyperplane that may be considered during construction of the search tree in accordance with the present invention.

FIG. 6 shows an example of problem decomposition using a hyperplane. The example involves four policy rule conditions in two dimensions. The x axis 601 and the y axis 602 are used for source and destination addresses, respectively. The four policy rule conditions are represented by four rectangles: C1 610, C2 620, C3 630 and C4 640. The original bounding box for the problem is the larger box 650.

Suppose a hyperplane defined by the right face of the box C2 along the source address dimension is being considered. In two dimensions, such a hyperplane is line 600, defined by $x=y\_\{1,2\}$ 605 in FIG. 6. With respect to this hyperplane 600, the original search space is divided into two smaller subspaces: a left one and a right one, and the original problem correspondingly is divided into a left and a right sub-problem. The original problem is reduced to the left sub-problem if it is known that the point to be searched is either on this hyperplane or to its left. On the other hand, it is reduced to the right sub-problem if it is known to be on its right.

Thus, the bounding box for the left subproblem 660 is obtained by replacing the right boundary of the original bounding box 650 along the x-axis by hyperplane (line) 600, the hyperplane of division. Similarly, that for the right subproblem 670 is obtained by replacing the left boundary of the original bounding box 650 along the same axis by the same hyperplane (line) 600. Since box C4 640 is the only box from the original set of boxes that lies wholly to the right of the hyperplane 600, the left sub-problem deals only with boxes C1 610, C2 620, and C3 630. Analogously, the right sub-problem deals with boxes C3 630 and C4 640 only, excluding the boxes C1 610 and C2 620 that are wholly on the left of the hyperplane 600. Note that box C3 630, being "cut" by the hyperplane, is part of both the left 660 and right 670 subproblems. While the figure illustrates one such hyperplane, the findBestCut routine examines bounding surfaces of all boxes as potential cuts for subdividing the problem and returns the "best" one based on some criteria. The returned hyperplane is identified by the dimension number and the attribute value associated with the hyperplane. For example, the hyperplane 600 in FIG. 6 is identified by dimension=1 (x-axis) and threshold value=$y\_\{1,2\}$ It should be noted that the choice of the hyperplane affects the depth of the tree, which is related to the search time and the size of the tree, which is related to the space requirements. It is often sufficient to consider only the unique right and left bounding surfaces of the boxes as candidate hyperplanes.

Generally, in an embodiment of the present invention, the following or other criteria is used to evaluate different hyperplanes in a given dimension:

Maximize the minimum of number of the boxes entirely to the left of the hyperplane and those entirely to the right of the hyperplane. Even more generally, one associates a weight with each of the boxes and maximizes the minimum of the weighted sum. Examples of weight assignments are:
  i. the volume of the box that lies within the bounding box, or
  ii. the number of edges of the box that lie within the bounding box.
    It is advantageous to use a type of cost function and/or weight so that a hyperplane chosen according to this function tends to balance the "complexity" of the two subproblems. A balanced complexity tends to reduce the query time.

Minimize the number of boxes that lie on both sides of the hyperplane. A hyperplane chosen according to this function tends to reduce the space (i.e., memory) requirements.

Minimize the distance of the hyperplane from the center of the bounding box. This cost function also tends to balance the "complexity" of the two subproblems.

An advantageous embodiment uses a combination of the heuristics described alone or in combination with other heuristics. The findBestCut routine returns the best hyperplane from amongst all the dimensions.

Some Other Potential Embodiments

The proposed architecture covers a number of different device arrangements depending on the function placement, including the following:

The Policy Manager/Repository may be collocated with the Policy Enforcement Entity and use a local configuration interface coupled with an internal database to provide the necessary functionality, or it may be implemented in a directory server which is accessible by a protocol such as LDAP.

The Policy Enforcement Entity, may be an end-host, where the packets are locally generated and intended for transmission on the network or it may be a network device such as a router or a firewall, where the packets are received on an incoming interface and are intended to be forwarded towards the ultimate destination.

The Combined Policy-matching Engine may be collocated with the service specific modules in the Policy Enforcement Entity. In this case the interface between them is a device specific API. Alternatively, the Combined Policy-matching Engine may be located in an external policy server and policy decisions may be outsourced to this device, while the service specific modules are located at the Policy Enforcement Entity such as the router or firewall. In such an architecture, the policy server functions as a single policy decision point serving a number of different network devices.

Thus an embodiment of the present invention may be implemented as a method for performing policy based classification of packets in a packet stream. The method comprising: obtaining a plurality of policy rules defined for a packet classification problem, the policy rules being range based; representing each policy rule condition as a hypercube in multidimensional space; choosing at least one hyperplane in the multidimensional space that divides a present classification problem such as to create an internal node having branches of a search tree, wherein each of the branches represents a sub-problem; and repeating the step of choosing by treating each sub-problem as being the present classification problem until a defined classification problem resolution is achieved.

In more particular embodiments of the method the step of choosing includes mapping the packet classification problem into a point location problem; and/or each policy rule includes at least one policy condition and at least one policy action; and/or conditions of the policy rules are defined in terms of ranges of selector attribute values; and/or the selector attributes include one or more of the following: source address, destination address, protocol, source port, destination port, incoming interface, outgoing interface, type of service value, and time of day; and/or the method includes creating a leaf node at each branch terminus at which the defined classification problem resolution is achieved; and/or the method includes storing in each internal node both a selector attribute identity and a threshold value corresponding with a respective said at least one hyperplane; and/or the method includes storing in each leaf node information about any candidate policy rule potentially applicable to a packet; and/or the information includes identity of every rule of the any candidate policy rule, and identity of any particular selector field attribute associated with the any candidate policy rule; and/or each particular selector field attribute is associated with at least one bound of a policy rule condition employed in performing a comparison to at least one specific attribute of each particular packet reaching the each leaf node; and/or the policy rule condition has an upper bound and a lower bound; and/or the step mapping includes limiting a search space to an original bounding box; and/or in each instance of the point location problem, the step of choosing the one hyperplane is restricted to choosing a hyperplane from among all bounding faces of hypercubes that lie within a current bounding box of the instance of the point location problem; and/or the bounding box for a left sub-problem is obtained by replacing a right boundary of the original bounding box in a same dimension as a dimension of the hyperplane; and/or the bounding box for a right sub-problem is obtained by replacing a left boundary of the original bounding box in a same dimension as a dimension of the hyperplane; and/or the method includes employing a particular hyperplane selected to divide a current instance of the classification problem to include all the hypercubes in the current instance of the classification problem that are to a first side of the particular hyperplane in a first sub-problem identified by a first branch of the internal node created, to include the hypercubes in the current instance of the classification problem that are to a second side of the particular hyperplane in a second sub-problem identified by a second branch of the internal node created, and to include all hypercubes in the current instance of the classification problem that are cut by the particular hyperplane in both the first and second sub-problems; and/or a defined level of resolution is said to have been achieved if a sub-problem at hand includes a defined number of hypercube faces lying within the current bounding box; and/or the step of choosing includes selecting a particular hyperplane which maximizes a minimum number of hypercubes constituting the current classification problem instance lying entirely to a first side and entirely to a second side of the hyperplane; and/or the step of choosing employs a secondary objective to choose the hyperplane which minimizes the number of hypercubes constituting a current classification problem instance that are cut by the chosen hyperplane; and/or the method includes traversing the search tree to identify applicable policy rules for each packet.

Alternate embodiments provide a method for classifying each of a plurality of packets in a packet stream on a packet based communication network, the method comprises: classifying a plurality of policy rules that apply to the packets based on multiple selector fields that include packet attributes; processing the policy rules for constructing a comparison based search tree structure; for each packet, identifying all the selector attributes that are relevant for packet classification; and traversing the comparison based tree structure to identify all applicable rules for each packet, where the applicability of a policy rule depends upon whether the selector attributes associated with a packet fall within a range of values determined from a policy rule specification.

In more particular embodiments of this method the packet attributes include at least one attribute chosen from a group consisting of values of header fields, header contents, identity of local interface on which packet arrived, and time of day; and/or the network is an IP network and the selector attributes include at least one attribute chosen from a group consisting of source address, destination address, protocol, source port, destination port, incoming interface, outgoing interface, type of Service value, time of day, and where policy conditions are specified using a range of values for at least one attribute; and/or leaf nodes of the comparison based tree specify a list of potentially applicable rules, Another alternate embodiment implements the present invention as an article of manufacture comprising a computer usable medium having computer readable program code means embodied therein for causing policy based classification of packets in a packet stream, the computer readable program code means in the article of manufacture comprising computer readable program code means for causing a computer to effect: obtaining a plurality of policy rules defined for a packet classification problem, the policy rules being range based; representing each policy rule condition as a hypercube in multidimensional space; choosing at least one hyperplane in the multidimensional space that divides a present classification problem such as to create an internal node having branches of a search tree, wherein each of the branches represents a sub-problem; and repeating the step of choosing by treating each sub-problem as being the present classification problem until a defined classification problem resolution is achieved.

In more particular embodiments of the article of manufacture, the computer readable program code means in the article of manufacture further comprising computer readable program code means for causing a computer to effect: employing the search tree for classifying each of the packets; and/or creating a leaf node at each branch terminus at which the defined classification problem resolution is achieved; and/or storing in each internal node both a selector attribute identity and a threshold value corresponding with a respective said at least one hyperplane; and/or storing in each leaf node information about any candidate policy rule potentially applicable to a packet.

Another alternate embodiment implements the present invention as an apparatus for performing policy based classification of packets in a packet stream, the apparatus comprising: means for obtaining a plurality of policy rules defined for a packet classification problem, the policy rules being range based; means for representing each policy rule condition as a hypercube in multidimensional space; means for choosing at least one hyperplane in the multidimensional space that divides a present classification problem such as to create an internal node having branches of a search tree, wherein each of the branches represents a sub-problem; and means for repeating a step of choosing said at least one hyperplane by treating each sub-problem as being the present classification problem until a defined classification problem resolution is achieved.

In more particular embodiments of the apparatus, the apparatus includes means for employing the search tree for classifying each of the packets; and/or the means for choosing includes mapping the packet classification problem into a point location problem. and/or includes means for creating a leaf node at each branch terminus at which the defined classification problem resolution is achieved; and/or includes means for storing in each internal node both a selector attribute identity and a threshold value corresponding with a respective said at least one hyperplane; and/or includes means for storing in each leaf node information about any candidate policy rule potentially applicable to a packet; and/or a defined level of resolution is said to have been achieved if a sub-problem at hand includes a defined number of hypercube faces lying within the current bounding box; and/or the means for choosing selects a particular hyperplane which maximizes a minimum number of hypercubes constituting the current classification problem instance lying entirely to a first side and entirely to a second side of the hyperplane; and/or the means for choosing employs a secondary objective to choose the hyperplane which minimizes the number of hypercubes constituting a current classification problem instance that are cut by the chosen hyperplane; and/or includes means for traversing the search tree to identify applicable policy rules for each packet.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. Even though the embodiments and descriptions often refer to right and left subproblems, the invention is clearly useful for any type of node division in any plane. Thus, the left side is to be considered as just a first side and the right side is to be considered as just an other side. The concepts of the invention may be implemented as a system, apparatus and/or method. It may also be implemented as an article of manufacture comprising a computer usable medium having computer readable program code means embodied therein for causing policy based classification of packets in a packet stream. The computer readable program code means in the article of manufacture comprising computer readable program code means for causing a computer to effect methods implementing concepts of the present invention.

It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for performing policy based classification of packets in a packet stream, the method comprising:
   obtaining a plurality of policy rules defined for a packet classification problem, said policy rules being range based;
   representing each policy rule condition as a hypercube in multidimensional space;
   choosing at least one hyperplane in the multidimensional space that divides a present classification problem such as to create an internal node having branches of a search tree, wherein each of the branches represents a sub-problem; and
   repeating the step of choosing by treating each sub-problem as being the present classification problem until a defined classification problem resolution is achieved.

2. A method as recited in claim 1, further comprising employing the search tree for classifying each of the packets.

3. A method as recited in claim 1, wherein the step of choosing includes mapping the packet classification problem into a point location problem.

4. A method as recited in claim 3, wherein the step of mapping includes limiting a search space to an original bounding box.

5. A method as in 4, wherein in each instance of the point location problem, the step of choosing said at least one hyperplane is restricted to choosing a hyperplane from among all bounding faces of hypercubes that lie within a current bounding box of said each instance of the point location problem.

6. A method as recited in claim 5, wherein a defined level of resolution is said to have been achieved if a sub-problem at hand includes a defined number of hypercube faces lying within the current bounding box.

7. A method as recited in claim 4, where the bounding box for a left sub-problem is obtained by replacing a right boundary of the original bounding box in a same dimension as a dimension of the hyperplane.

8. A method as recited in claim 4, where the bounding box for a right sub-problem is obtained by replacing a left boundary of the original bounding box in a same dimension as a dimension of the hyperplane.

9. A method as recited in claim 1, wherein each policy rule includes at least one policy condition and at least one policy action.

10. A method as recited in claim 9, wherein conditions of the policy rules are defined in terms of ranges of selector attribute values.

11. A method as recited in claim 10, wherein the selector attributes include source address, destination address, protocol, source port, destination port, incoming interface, outgoing interface, type of service value, and time of day.

12. A method as recited in claim 1, further comprising creating a leaf node at a branch terminus of each branch at which said defined classification problem resolution is achieved.

13. A method as recited in claim 12, further comprising storing in each leaf node information about any candidate policy rule potentially applicable to a packet.

14. A method as recited in claim 13, wherein the information stored in each leaf node includes identity of every rule of said any candidate policy rule, and identity of any particular selector field attribute associated with said any candidate policy rule.

15. A method as recited in claim 14, wherein each particular selector field attribute is associated with at least one bound of a policy rule condition employed in performing a comparison to at least one specific attribute of each particular packet reaching said each leaf node.

16. A method as recited in claim 15, wherein said policy rule condition has an upper bound and a lower bound.

17. A method as recited in claim 1, further comprising storing in each internal node both a selector attribute identity and a threshold value corresponding with a respective said at least one hyperplane.

18. A method as recited in claim 17, further comprising employing a particular hyperplane selected to divide a current instance of the classification problem to include all the hypercubes in the current instance of the classification problem that are to a first side of the particular hyperplane in a first sub-problem identified by a first branch of the internal node created, to include the hypercubes in the current instance of the classification problem that are to a second side of the particular hyperplane in a second sub-problem identified by a second branch of the internal node created, and to include all hypercubes in the current instance of the classification problem that are cut by the particular hyperplane in both the first and second sub-problems.

19. A method as recited in claim 17, wherein the step of choosing includes selecting a particular hyperplane which maximizes a minimum number of hypercubes constituting the current classification problem instance lying entirely to a first side and entirely to a second side of the hyperplane.

20. A method as recited in claim 1, wherein the step of choosing employs a secondary objective to choose the hyperplane which minimizes the number of hypercubes constituting a current classification problem instance that are cut by the chosen hyperplane.

21. A method as recited in claim 1, further comprising traversing the search tree to identify applicable policy rules for each packet.

22. A method as recited in claim 21, wherein during a traversal of the search tree, if the current node is an internal node that specifies a threshold value "v", and specifies an identity of a selector field "d", when a selector attribute "[d]" is the numeric equivalent of the corresponding selector field associated with the packet a first subtree specified by the internal node is traversed next if the numeric value of the selector attribute "[d]" is smaller than or equal to that of "v", otherwise a second subtree specified by the internal node is traversed next if the numeric value of "Selector Array[d]" is greater than that of "v".

23. A method as recited in claim 22, wherein
   $W=((x\_\{1\}, y\_\{1\}), \ldots, (x\_\{D\}, y\_\{D\}))$
denotes a particular policy rule condition obtained in the step of obtaining, $x\_\{i\}$ represents a lower bound and $y\_\{i\}$ represents an upper bound of a range in an attribute I, the step of representing includes applying the particular policy rule condition only when for each attribute d in an upper bound list associated with W, selector attribute "[d]" is less than or equal to y_{d}, and for each attribute d in the lower bound dimension list associated with W,selector attribute "[d]" is greater or equal to x_{d}.

24. A method as recited in claim 23, wherein when the step of applying is not performed for any candidate in the candidate list, the search terminates without finding a match.

25. A method as recited in claim 21, wherein the step of traversing applies no policy rule to a current node which is a leaf node that specifies an empty candidate list.

26. A method as recited in claim 21, wherein when a current node is a leaf node that specifies a non empty candidate list, the step of traversing includes considering each of the candidate boxes in a candidate list for applicability using an associated list of attribute identities for which upper bound and lower bound verifications need to be done.

27. A method as recited in claim 1, where the packet network is an IP network.

28. A method as recited in claim 1, wherein the step of choosing at least one hyperplane forms the search tree by preprocessing a given set of policy rules using a geometric representation of policy rule conditions as at least two dimensional bounding boxes, where the preprocessing uses a bounding box to limit the scope of the search by iteratively dividing the search space into two subspaces and correspondingly two smaller subproblems to choose a hyperplane from among the surfaces of the bounding boxes.

29. A method as recited in claim 28, wherein the means for choosing forms a bounding box for a "left" subproblem obtained by replacing a "right" boundary of an original bounding box in the same dimension as that of the hyperplane with a chosen hyperplane.

30. A method as recited in claim 28, where the bounding box for the "right" subproblem is obtained by replacing the left boundary of the original bounding box in the same dimension as that of the hyperplane by the chosen hyperplane.

31. The method as recited in claim 28, wherein a set of boxes to be considered by the "left" subproblem is obtained by removing all the original boxes that are wholly to the right of the chosen hyperplane.

32. The method as recited in claim 28, where the set of boxes to be considered by the "right" subproblem is obtained by removing all the original boxes that are wholly to the left of the chosen hyperplane.

33. An article of manufacture comprising a computer usable medium having computer readable program code means embodied therein for causing policy based classification of packets in a packet stream, the computer readable program code means in said article of manufacture comprising computer readable program code means for causing a computer to effect:
 obtaining a plurality of policy rules defined for a packet classification problem, said policy rules being range based;
 representing each policy rule condition as a hypercube in multidimensional space;
 choosing at least one hyperplane in the multidimensional space that divides a present classification problem such as to create an internal node having branches of a search tree, wherein each of the branches represents a sub-problem; and
 repeating the step of choosing by treating each sub-problem as being the present classification problem until a defined classification problem resolution is achieved.

34. An article of manufacture as recited in claim 33, the computer readable program code means in said article of manufacture further comprising computer readable program code means for causing a computer to effect employing the search tree for classifying each of the packets.

35. An article of manufacture as recited in claim 33, wherein the step of choosing includes mapping the packet classification problem into a point location problem.

36. An article of manufacture as recited in claim 35, wherein the step mapping includes limiting a search space to an original bounding box.

37. An article of manufacture as recited in claim 36, wherein in each instance of the point location problem, the step of choosing said at least one hyperplane is restricted to choosing a hyperplane from among all bounding faces of hypercubes that lie within a current bounding box of said each instance of the point location problem.

38. An article of manufacture as recited in claim 37, wherein a defined level of resolution is said to have been achieved if a sub-problem at hand includes a defined number of hypercube faces lying within the current bounding box.

39. An article of manufacture as recited in claim 36, wherein the bounding box for a left sub-problem is obtained by replacing a right boundary of the original bounding box in a same dimension as a dimension of the hyperplane.

40. An article of manufacture as recited in claim 36, wherein the bounding box for a right sub-problem is obtained by replacing a left boundary of the original bounding box in a same dimension as a dimension of the hyperplane.

41. An article of manufacture as recited in claim 33, wherein the packet network is an enterprise network.

42. An article of manufacture as recited in claim 33, wherein each policy rule includes at least one policy condition and at least one policy action.

43. An article of manufacture as recited in claim 42, wherein conditions of the policy rules are defined in terms of ranges of selector attribute values.

44. An article of manufacture as recited in claim 43, wherein the selector attributes include source address, destination address, protocol, source port, destination port, incoming interface, outgoing interface, type of service value, and time of day.

45. An article of manufacture as recited in claim 33, the computer readable program code means in said article of manufacture further comprising computer readable program code means for causing a computer to effect creating a leaf node at each branch terminus of each branch at which said defined classification problem resolution is achieved.

46. An article of manufacture as recited in claim 33, the computer readable program code means in said article of manufacture further comprising computer readable program code means for causing a computer to effect storing in each internal node both a selector attribute identity and a threshold value corresponding with a respective said at least one hyperplane.

47. An article of manufacture as recited in claim 46, the computer readable program code means in said article of manufacture further comprising computer readable program code means for causing a computer to effect storing in each leaf node information about any candidate policy rule potentially applicable to a packet.

48. An article of manufacture as recited in claim 47, wherein the information stored in each leaf node includes identity of every rule of said any candidate policy rule, and identity of any particular selector field attribute associated with said any candidate policy rule.

49. An article of manufacture as recited in claim 48, wherein each particular selector field attribute is associated with at least one bound of a policy rule condition employed in performing a comparison to at least one specific attribute of each particular packet reaching said each leaf node.

50. An article of manufacture as recited in claim 49, wherein said policy rule condition has an upper bound and a lower bound.

51. An article of manufacture as recited in claim 46, the computer readable program code means in said article of manufacture further comprising computer readable program code means for causing a computer to effect employing a particular hyperplane selected to divide a current instance of the classification problem:
- to include all hypercubes in the current instance of the classification problem that are to a first side of the particular hyperplane in a first sub-problem identified by a first branch of the internal node created,
- to include all hypercubes in the current instance of the classification problem that are to a second side of the particular hyperplane in a second sub-problem identified by a second branch of the internal node created, and
- to include all hypercubes in the current instance of the classification problem that are cut by the particular hyperplane in both the first and second sub-problems.

52. An article of manufacture as recited in claim 46, wherein the step of choosing includes selecting a particular hyperplane which maximizes a minimum number of hypercubes constituting the current classification problem instance lying entirely to a first side and entirely to a second side of the hyperplane.

53. An article of manufacture as recited in claim 33, wherein the step of choosing employs a secondary objective to choose the hyperplane which minimizes the number of hypercubes constituting a current classification problem instance that are cut by the chosen hyperplane.

54. An article of manufacture as recited in claim 33, the computer readable program code means in said article of manufacture further comprising computer readable program code means for causing a computer to effect traversing the search tree to identify applicable policy rules for each packet.

55. An article of manufacture as recited in claim 54, wherein the step of traversing applies no policy rule to a current node which is a leaf node that specifies an empty candidate list.

56. An apparatus comprising:
- a policy rule matching engine;
- a policy manager coupled to the policy rule matching engine to provide tools to a policy administrator;
- a policy administrator for defining and validating policy rules;
- a policy repository coupled to the policy rule matching engine and the policy manager to store the policy rules, and to enable the policy rule matching engine to fetch a plurality of policy rules from the policy repository; and
- a policy enforcement entity module coupled to receive traffic classification from the policy rule matching engine and is responsible for differential treatment of traffic flows based on the traffic classification.

57. An apparatus as recited in claim 56, wherein the policy enforcement entity is a router.

58. An apparatus as recited in claim 57, wherein the policy enforcement entity includes a packet filter, a packet forwarder, a packet buffer manager and a packet scheduler.

59. An apparatus as recited in claim 56, wherein the traffic classification is determined by an internal state of the policy enforcement entity.

60. An apparatus as recited in claim 56, further comprising a selector having attributes specified by the policy enforcement entity.

61. An apparatus as recited in claim 60, wherein the selector includes selector fields for source address, destination address, protocol, source port, destination port and types of service.

62. An apparatus as recited in claim 56, wherein each of the policies has an attribute given by at least one of the selector fields.

63. An apparatus as recited in claim 62, wherein the attribute is used to build a binary search tree.

64. An apparatus as recited in claim 63, wherein the search tree is comprised of a short list of candidates, and a first and a second list of dimensions associated with each of the candidates in the list.

65. An apparatus for performing policy based classification of packets in a packet stream, the apparatus comprising:
- means for obtaining a plurality of policy rules defined for a packet classification problem, said policy rules being range based;
- means for representing each policy rule condition as a hypercube in multidimensional space;
- means for choosing at least one hyperplane in the multi-dimensional space that divides a present classification problem such as to create an internal node having branches of a search tree, wherein each of the branches represents a sub-problem; and
- means for repeating a step of choosing said at least one hyperplane by treating each sub-problem as being the present classification problem until a defined classification problem resolution is achieved.

66. An apparatus as recited in claim 65, further comprising means for employing the search tree for classifying each of the packets.

67. An apparatus as recited in claim 65, wherein the means for choosing includes mapping the packet classification problem into a point location problem.

68. An apparatus as recited in claim 67, wherein the means for mapping limits a search space to an original bounding box.

69. An apparatus as recited in claim 68, wherein in each instance of the point location problem, the means for choosing said at least one hyperplane is restricted to choosing a hyperplane from among all bounding faces of hypercubes that lie within a current bounding box of said each instance of the point location problem.

70. An apparatus as recited in claim 69, wherein a defined level of resolution is said to have been achieved if a sub-problem at hand includes a defined number of hypercube faces lying within the current bounding box.

71. An apparatus as recited in claim 68, where the bounding box for a left sub-problem is obtained by replacing a right boundary of the original bounding box in a same dimension as a dimension of the hyperplane.

72. An apparatus as recited in claim 68, where the bounding box for a right sub-problem is obtained by replacing a left boundary of the original bounding box in a same dimension as a dimension of the hyperplane.

73. An apparatus as recited in claim 65, wherein each policy rule includes at least one policy condition and at least one policy action.

74. An apparatus as recited in claim 65, wherein conditions of the policy rules are defined in terms of ranges of selector attribute values.

75. An apparatus as recited in claim 74, wherein the selector attributes include incoming interface, outgoing interface, type of service value, and time of day.

76. An apparatus as recited in claim 65, further comprising means for creating a leaf node at a branch terminus of each branch at which said defined classification problem resolution is achieved.

77. An apparatus as recited in claim 76, further comprising means for storing in each leaf node information about any candidate policy rule potentially applicable to a packet.

78. An apparatus as recited in claim 77, wherein the information stored in each leaf node includes identity of every rule of said any candidate policy rule, and identity of any particular selector field attribute associated with said any candidate policy rule.

79. An apparatus as recited in claim 78, wherein each particular selector field attribute is associated with at least one bound of a policy rule condition employed in performing a comparison to at least one specific attribute of each particular packet reaching said each leaf node.

80. An apparatus as recited in claim 79, wherein the policy rule condition has an upper bound and a lower bound.

81. An apparatus as recited in claim 65, further comprising means for storing in each internal node both a selector attribute identity and a threshold value corresponding with a respective said at least one hyperplane.

82. An apparatus as recited in claim 81, further comprising means for employing a particular hyperplane selected to divide a current instance of the classification problem to include all the hypercubes in the current instance of the classification problem that are to a first side of the particular hyperplane in a first sub-problem identified by a first branch of the internal node created, to include the hypercubes in the current instance of the classification problem that are to a second side of the particular hyperplane in a second sub-problem identified by a second branch of the internal node created, and to include all hypercubes in the current instance of the classification problem that are cut by the particular hyperplane in both the first and second sub-problems.

83. An apparatus as recited in claim 81, wherein the means for choosing selects a particular hyperplane which maximizes a minimum number of hypercubes constituting the current classification problem instance lying entirely to a first side and entirely to a second side of the hyperplane.

84. An apparatus as recited in claim 65, wherein the means for choosing employs a secondary objective to choose the hyperplane which minimizes the number of hypercubes constituting a current classification problem instance that are cut by the chosen hyperplane.

85. An apparatus as recited in claim 65, further comprising means for traversing the search tree to identify applicable policy rules for each packet.

86. A method for searching a database, the method comprising:
   a policy manager coupling to a policy rule matching engine and providing tools to a policy administrator;
   a policy administrator defining and validating policy rules;
   a policy repository coupling to the policy rule matching engine and to the policy manager and storing the policy rules, and enabling the policy rule matching engine to fetch a plurality of policy rules from the policy repository; and
   a policy enforcement entity module coupling to receive traffic classification from the policy rule matching engine and being responsible for differential treatment of traffic flows based on the traffic classification.

87. A method for classifying each of a plurality of packets in a packet stream on a packet based communication network, the method comprising:
   classifying a plurality of policy rules that apply to the packets based on multiple selector fields that include packet attributes;
   processing the policy rules for constructing a comparison based search tree structure;
   for each packet, identifying all the selector attributes that are relevant for packet classification; and
   traversing the comparison based tree structure to identify all applicable rules for said each packet, where the applicability of a policy rule depends upon whether the selector attributes associated with a packet fall within a range of values determined from a policy rule specification.

88. A method as recited in claim 87, wherein the packet attributes include at least one attribute chosen from a group consisting of values of header fields, header contents, identity of local interface on which packet arrived, and time of day.

89. A method as recited in claim 88, wherein the network is an IP network and the selector attributes include at least one attribute chosen from a group consisting of source address, destination address, protocol, source port, destination port, incoming interface, outgoing interface, type of Service value, time of day, and where policy conditions are specified using a range of values for at least one attribute.

90. A method as recited in claim 87, wherein leaf nodes of the comparison based tree specify a list of potentially applicable rules.

91. A method as recited in claim 90, wherein a rule is deemed applicable to a packet if for all selector attributes "d", the corresponding numeric values for a packet's "Selector Array[d]" are within ranges of selector fields specified in a condition of the rule.

92. The method as recited in claim 91, wherein for each of the candidate rules in a list maintained at the leaf nodes of the comparison based tree, there is a separate specification of identities of selector fields for which a packet must be checked against the lower bound of the range and those for which it must be checked against the upper bound of the range specified in the candidate policy condition.

93. A method as recited in claim 87, wherein the step of processing includes:
   forming a geometric representation of policy rule conditions as "D" dimensional bounding boxes;
   using each bounding box to limit the scope of the search; and
   iteratively dividing the search space into a left and a right subspace, and correspondingly forming a left and a right subproblem by choosing a particular hyperplane from among the surfaces of the bounding boxes.

94. A method as recited in claim 93, further comprising obtaining a bounding box for the left subproblem by replacing a right boundary of an original bounding box in the same dimension as that of the hyperplane with the particular hyperplane.

95. A method as recited in claim 93, further comprising obtaining a bounding box for the right subproblem by replacing a left boundary of an original bounding box in the same dimension as that of the hyperplane with the particular hyperplane.

96. A method as recited in claim 93, wherein a set of boxes to be considered by the "left" subproblem is obtained by removing all the original boxes that are wholly to the right of the chosen hyperplane.

97. A method as recited in claim 93, wherein a set of boxes to be considered by the "right" subproblem is obtained by removing all the original boxes that are wholly to the left of the chosen hyperplane.

98. A computer program product comprising a computer usable medium having computer readable program code means embodied therein for causing classification of each of a plurality of packets in a packet stream on a packet based communication network, the computer readable program code means in said computer program product comprising computer readable program code means for causing a computer to effect:

classifying a plurality of policy rules that apply to the packets based on multiple selector fields that include packet attributes;

processing the policy rules for constructing a comparison based search tree structure;

for each packet, identifying all the selector attributes that are relevant for packet classification; and traversing the comparison based tree structure to identify all applicable rules for said each packet, where the applicability of a policy rule depends upon whether the selector attributes associated with a packet fall within a range of values determined from a policy rule specification.

* * * * *